(12) United States Patent
Nakatani et al.

(10) Patent No.: US 7,296,041 B2
(45) Date of Patent: Nov. 13, 2007

(54) INTER-SERVER DYNAMIC TRANSFER METHOD FOR VIRTUAL FILE SERVERS

(75) Inventors: Yoji Nakatani, Yamato (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 10/919,392

(22) Filed: Aug. 17, 2004

(65) Prior Publication Data

US 2005/0210074 A1 Sep. 22, 2005

Related U.S. Application Data

(63) Continuation of application No. 10/860,319, filed on Jun. 4, 2004.

(30) Foreign Application Priority Data

Mar. 19, 2004 (JP) .............................. 2004-079882

(51) Int. Cl.
*G06F 17/30* (2006.01)
(52) U.S. Cl. ..................................... 707/204
(58) Field of Classification Search .................... 707/1, 707/2, 10, 104.1, 204; 709/224, 203; 703/24; 714/4

See application file for complete search history.

(56) References Cited

U.S. PATENT DOCUMENTS

| | | | |
|---|---|---|---|
| 5,873,085 A * | 2/1999 | Enoki et al. .................. | 707/10 |
| 6,317,844 B1 | 11/2001 | Kleiman | |
| 6,609,213 B1 | 8/2003 | Nguyen et al. | |
| 6,795,803 B1 * | 9/2004 | Tanaka et al. ................. | 703/24 |
| 6,801,949 B1 | 10/2004 | Bruck et al. | |
| 6,868,442 B1 | 3/2005 | Burdeau | |
| 2003/0018927 A1 | 1/2003 | Gadir et al. | |
| 2003/0135578 A1 | 7/2003 | Banga et al. | |
| 2005/0108593 A1 * | 5/2005 | Purushothaman et al. ..... | 714/4 |

FOREIGN PATENT DOCUMENTS

| | | |
|---|---|---|
| EP | 00/07101 | 10/2000 |
| EP | 1326408 | 9/2003 |

* cited by examiner

*Primary Examiner*—Etienne Leroux
(74) *Attorney, Agent, or Firm*—Mattingly, Stanger, Malur & Brundidge, P.C.

(57) ABSTRACT

An object of the present invention is to dynamically transfer a virtual file server within a cluster that is configured by a plurality of file servers in which virtual file servers are set up. A storage system includes: a first file server; a second file server; and a disk subsystem, in which: the first file server and the second file server each include a virtual file server control unit that sets up the virtual file server; the virtual file server includes a routing table that stores path information necessary for communication; and the virtual file server started up in the second file server determines a communication path by using the routing table used by the virtual file server in the first file server after taking a failover from the virtual file server of the first file server to the second file server.

8 Claims, 5 Drawing Sheets

FIG. 3

・MOUNT TABLE    103

| FILE SYSTEM ID | inode# | PARENT FILE SYSTEM | MOUNT POINT | PARENT inode# | DEVICE NAME |
|---|---|---|---|---|---|
| fs0 | 2 | - | / | - | dev0 |
| fs1 | 200 | fs0 | /export/fs1 | 20 | dev1 |
| fs2 | 500 | fs0 | /export/fs2 | 30 | dev2 |

・DEVICE FILE    104

| DEVICE NAME | DEVICE ID |
|---|---|
| dev0 | 8000 |
| dev1 | 8001 |
| dev2 | 8002 |

・ROUTING TABLE    102

| DESTINATION | gateway | mask | NETWORK INTERFACE |
|---|---|---|---|
| 192.168.1.0 | - | 255.255.255.0 | eth0 |
| 192.168.2.0 | - | 255.255.255.0 | eth1 |
| default | 192.168.1.1 | 0.0.0.0 | eth0 |

FIG. 5

| DEVICE # / vs# | 0 | 1 | 2 | 3 |
|---|---|---|---|---|
| 1 | ⦿ | ○ | ○ | ○ |
| 2 | ○ | ⦿ | ○ | ○ |
| 3 | ○ | ○ | ⦿ | ○ |
| 4 | ⦿ | ○ | ○ | ○ |
| 5 | ○ | ○ | ○ | ⦿ |

VIRTUAL FILE SERVER DISPOSAL SETTING

UPDATE

INTER-SERVER DYNAMIC TRANSFER METHOD FOR VIRTUAL FILE SERVERS

This is a continuation application of U.S. Ser. No. 10/860,319, filed Jun. 4, 2004.

CLAIM OF PRIORITY

The present application claims priority from Japanese application P2004-79882 filed on Mar. 19, 2004, the content of which is hereby incorporated by reference into this application.

BACKGROUND

The present invention relates to a storage system in which a cluster is configured by a plurality of file servers in which virtual file servers are set up. In particular, the present invention relates to a virtual file server taking over technique.

In a logical partition technique of a computer, resources within the computer such as a processor and memory are logically divided, and each allocated to a virtual computer.

A technique has been proposed for setting up virtual file servers, which are virtual service units operating on one file server, with each of the virtual file servers residing on different networks. This is achieved by applying the logical division technique and dividing network resources or the like for each virtual file server. According to the technique for setting up virtual file servers, it becomes possible to provide separate services for a plurality of network segments that possess the same private address by using one file server (refer to US 2003/0135578 A, for example).

Further, a failover function is known in which plural file servers monitor one another by periodically reporting operation status among them via communication path or shared disks, and one file server takes over another file server's service upon detecting the failure of the another file server (refer to U.S. Pat. No. 6,317,844, for example).

SUMMARY

The transfer of the virtual file servers between the file servers for cases where a cluster is configured by using the plural file servers that include the virtual file servers is not considered, however.

Further, the virtual file servers cannot be transferred between the file servers. Accordingly, load balance in units of the virtual file servers cannot be performed, and the load may concentrate in a specific file server.

An object of the present invention is to dynamically transfer a virtual file server within a cluster that is configured by a plurality of file servers in which virtual file servers are set up.

The present invention provides a storage system comprising: a first file server; a second file server; and a disk subsystem, wherein: each of the file server comprise: a network interface that inputs/outputs the data on a network; and a virtual file server controlling unit that controls startup and shutdown of a virtual file server, and sets up the virtual file server in the file server; the virtual file server comprises: a network processing unit that transmits and receives signals to and from the network by using settings of the network interface and the network interface; and a routing table that stores path information necessary for communicating with devices that are connected through the network interface; and the virtual file server started up in the second file server determines a communication path by using the routing table used by the virtual file server in the first file server, after the virtual file server of the second file server failover from the virtual file server of the first file server.

According to the present invention, by dynamically transferring virtual file servers within a cluster that is configured by a plurality of servers (devices) in which virtual file servers are set up, it becomes possible to perform failover for only the virtual file servers in which a failure occurs, and it becomes possible to perform load balance in units of the virtual file servers.

BRIEF DESCRIPTION OF THE DRAWINGS

FIG. 3 is a diagram for explaining tables that are used in a storage system according to an embodiment of the present invention.

FIG. 5 is a diagram for explaining a virtual file server disposal setting screen in a storage system according to an embodiment of the present invention.

DETAILED DESCRIPTION OF THE PREFERRED EMBODIMENTS

Embodiments of the present invention are explained below with reference to the drawings.

Figure 1:
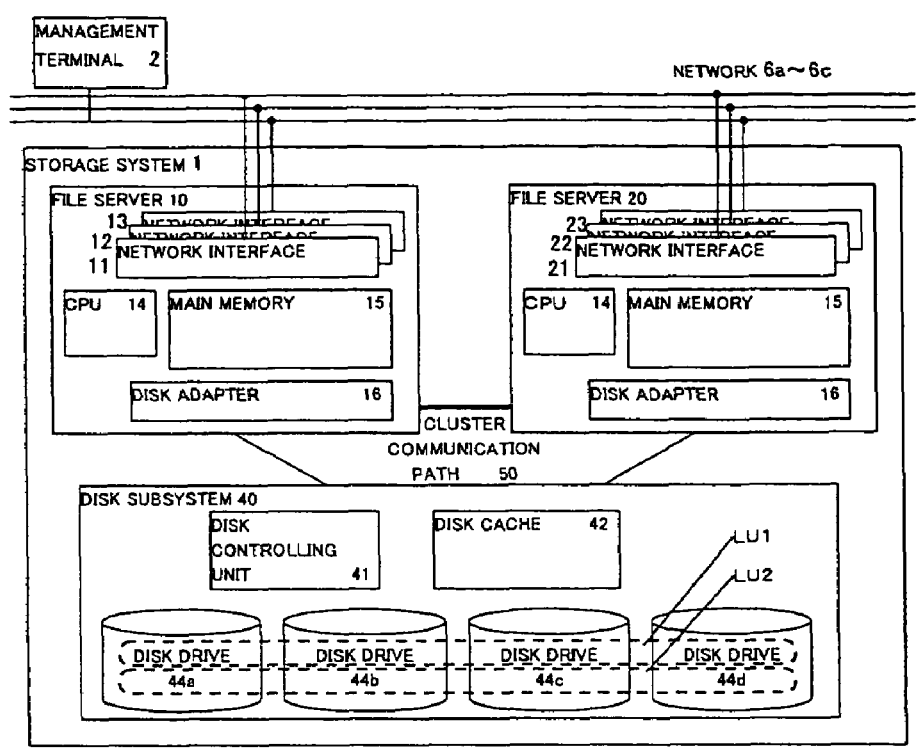
FIG. 1 is a block diagram showing a configuration of a storage system according to an embodiment of the present invention.

FIG. 1 is a block diagram showing a configuration of a storage system according to an embodiment of the present invention.

A storage system 1 of the embodiment of the present invention comprises a plurality of file servers 10 and 20, and a disk subsystem 40. The storage system 1 constitutes an NAS (network attached storage). Further, the file server 10 and the file server 20 configure a cluster.

The file server 10 is composed and configured by hardware including network interfaces 11 to 13, a CPU 14, a main memory 15, and a disk adapter 16.

Further, resources that are provided to the file server 10 (the network interfaces 11 to 13, the CPU 14, the main memory 15, and the disk adapter 16) configure virtual file servers 10a, 10b, and 10c that operate independently within the file server 10 by running programs that configure the virtual file servers 10a, 10b, and 10c on the CPU 14. That is, the CPU 14 runs the programs that configure the virtual file servers and that are stored in the main memory 15, so that a plurality of virtual file servers are constructed in the file server 10, and the resources (the CPU 14, the main memory 15, the disk adapter 16, and the like) are shared between the virtual file servers.

The network interfaces 11 to 13 are interfaces to clients (not shown), and perform communication according to a protocol such as TCP/IP. It should be noted that the network interfaces that can perform communication according to fiber channels or iSCSI (internet SCSI) may also be used. Further, the network interfaces 11 to 13 may be connected to a network (VLAN, Virtual LAN) according to virtual groups set up within the network. In addition, the network interfaces 11 to 13 are each connected to different networks (different segments) from among networks 6a, 6b, and 6c.

The disk adapter 16 performs protocol processing for a disk subsystem 40, such as a fiber channel.

The file server 10 can access an LU (logical unit) within the disk subsystem 40 by using the disk adapter 16, and can read and write data that is stored in a disk drive.

It should be noted that, although the file server 10 is explained here, the file server 20 also has a similar configuration. The file server 10 and the file server 20 are configured by using physically different hardware.

The file server 10 and the file server 20 are connected by a cluster communication path 50. The cluster communication path 50 may be a communication path such as a LAN or an Infini-band provided within the storage system 1, and may be made via an external network.

The file server 10 and the file server 20 mutually monitor each other's states by mutual communication of the states. A cluster is configured by the file server 10 and the file server 20. It should be noted that the file server 10 and the file server 20 can mutually observe each other's states by sharing a disk cache or a specific region of a disk drive and periodically reading and writing predetermined data, without using a specific cluster communication path.

The disk subsystem 40 is connected to the file server 10, and comprises a disk controlling unit 41, a disk cache 42, and disk drives 44a, 44b, 44c, and 44d.

The disk controlling unit 41 receives data input/output requests from the disk adapter 16 of the file server 10, controlling data input/output on the disk drives 44a, 44b, 44c, and 44d.

The disk cache 42 temporarily stores data read out from the disk drives 44a, 44b, 44c, and 44d, and data to be written into the disk drives 44a, 44b, 44c, and 44d. The disk cache 42 improves the access performance of the storage system 1 with respect to clients.

The logical units (LUs), which are units that an OS can recognize as one disk, are set up on the disk drives 44a, 44b, 44c, and 44d. Further, the logical units are configured by RAID (redundant array of independent disks), and allow for redundancy for the stored data. Accordingly, the stored data is not lost even if a failure occurs in a portion of the disk drive 44a, 44b, 44c, or 44d.

A management terminal 2 is a computer unit comprising a CPU, a memory, a storage unit, and a network interface. The management terminal 2 operates management programs in order to perform settings and the like on the cluster and the file servers. It should be noted that one management terminal may be provided for each virtual server.

The networks 6a, 6b, and 6c are networks that perform communication by using protocols such as TCP/IP.

Figure 2:
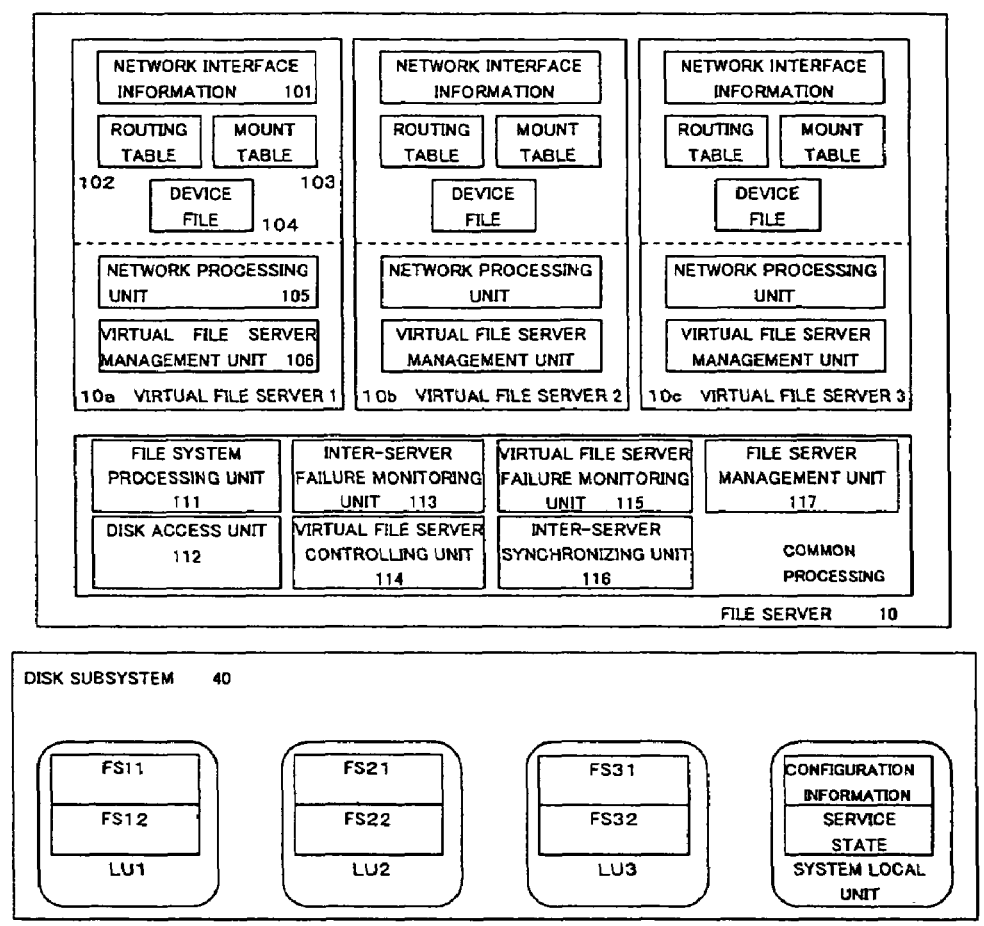
FIG. 2 is a functional block diagram of a storage system according to an embodiment of the present invention.

FIG. 2 is a functional block diagram of a storage system according to an embodiment of the present invention.

The virtual file server 10a, the virtual file server 10b, and the virtual file server 10c are set up in the file server 10. The virtual file server 10a is explained below. The virtual file servers 10b and 10c also have the same configuration.

The virtual file server 10a comprises a network processing unit 105 and a virtual file server management unit 106.

The network processing unit 105 sets up the network interfaces 11 to 13 that included in the virtual file server, and transmits data and control signals to, and receives data and control signals from, the networks by using the network interfaces. Further, the network processing unit 105 also performs processing related to a network file system (NFS), common internet file system (CIFS), or the like.

The virtual file server management unit 106 makes settings (such as network settings, mounting of file system, and user management) for each of the virtual file servers based on instructions from the management terminal 2.

Further, the virtual file server 10a comprises a network interface information 101, a routing table 102, a mount table 103, and a device file 104.

Information (such as a protocol file adapted to determine a communication protocol such as a communication transfer length) for controlling the accessible network interfaces 11 to 13 by the virtual file server 10a is included as recorded information in the network interface information 101.

Routing information necessary for communicating with devices that are connected to the networks 6a, 6b, and 6c through the network interfaces 11 to 13 is stored in the routing table 102. The routing table 102 is provided as divided for each of the virtual file servers. Accordingly, the different virtual file servers of the same file server 10 can be connected to different network segments using the same IP address.

File system information that is accessible by the virtual file server 10a (such as mount points and device names) is stored in the mount table 103.

The device file 104 is a file for accessing the LUs. A device driver incorporated into an OS kernel is started up by accessing the device file 104 when there is a request for data input/output on the disk subsystem 40, thus achieving access to the LUs on the disk subsystem 40. The mount table 103 and the device file 104 are provided as divided for each of the virtual file servers. Accordingly, startup and shutdown can be performed on each of the virtual file servers.

The virtual file server 1 has been explained so far. The virtual file server 2 and the virtual file server 3 each have the same configuration.

It should be noted that, in order to divide the file system provided according to each of the virtual file servers, the mount table 103 and the device file 104 are provided as divided for each virtual file server. However, it is not always necessary to divide the mount table 103 and the device file 104 when there is no need to divide the file system according to each of the virtual file servers.

Further, the mount table 103, the device file 104, and the network processing unit 105 are provided as divided for each of the virtual file servers but may be provided in a common processing unit with which the mount table 103, the device file 104, and the network processing unit 105 are shared by the file servers for cases where different virtual file servers are allowed to access the same LUs.

Further, a file system processing unit 111, a disk access unit 112, an inter-server failure monitoring unit 113, a virtual file server controlling unit 114, a virtual file server failure monitoring unit 115, an inter-server synchronizing unit 116, and a file server management unit 117 are provided for processing that is common to the virtual file servers 10a, 10b, and 10c. Each of the units is realized by executing a program, which is stored in the main memory 15, in the CPU 14.

The file system processing unit 111 receives requests from the virtual file servers 10a, 10b, and 10c, and instructs the disk access unit 112 and the like to perform file access processing.

The disk access unit 112 receives requests from the file system processing unit 111 and the like, and performs data input from, and data output to, the disk subsystem.

The inter-server failure monitoring unit 113 periodically monitors the operation state of other devices (the file server 20) within the cluster. Failover is performed for cases where a failure in another file server is detected in order to take over the service performed by the failed file server.

The virtual file server controlling unit 114 controls the virtual file servers 10a, 10b, and 10c. The virtual file server controlling unit 114 controls startup and shutdown, definitions and deletions, allocation and deletion of resources, and the like. That is, the virtual file server controlling unit 114 sets up the virtual file servers in the file server 10.

The virtual file server failure monitoring unit 115 monitors the operation states of the virtual file servers 10a, 10b, and 10c that are operating within the file server 10 and the file server 20, and detects virtual file servers in which a failure occurs.

The inter-server synchronizing unit 116 controls startup and shutdown timings of the virtual file servers, and synchronizes startup and shutdown of the virtual file servers, through communication with the file server 10 within the cluster. This synchronization process is aimed to synchronize the virtual file servers provided in file servers different in terms of hardware.

The file server management unit 117 performs file server management based on instructions from the management terminal 2. For example, the file server management unit 117 manages operation of the storage system 1 according to cluster settings, network (including VLAN) configuration settings, and the like. Further, the file server management unit 117 changes the settings of the virtual file servers, issues an instruction of inter-server transfer of the virtual file server, and the like. In addition, the file server management unit 117 instructs the virtual file server controlling unit 114 to perform processing when operation of the virtual file server is directed.

The logical units (LUs) are provided in the disk subsystem 40, and the LUs are provided as divided for use by each of the virtual file servers. For example, a logical unit LU1 is accessed by a virtual file server 1, a logical unit LU2 is accessed by a virtual file server 2, and a logical unit LU3 is accessed by a virtual file server 3.

It should be noted that, although the logical units (LUs) are provided as divided according to each of the virtual file servers in order to divide the file system for each of the virtual file servers, it is not necessary to divide the logical units for each virtual file server if not required.

A system logical unit (system LU) that is shared between the file servers is provided in the disk subsystem 40. A variety of processing programs and data used by the virtual file servers are stored in the system logical unit, which is accessible from the virtual file servers of each file server. Accordingly, the system LU functions as a common volume.

Configuration information and service state files are stored in the system LU. Physical resource allocation information for each of the virtual file servers is contained in the information. For example, information on the network interfaces 11 to 13 and allocations of the logical units to the virtual file servers may be contained in the configuration information. Further, from among pieces of information stored in the virtual file server 10a, information on the mount table 103, the routing table 102, and the device file 104 are copied and stored in the service state file. For example, information on what services to provide by the virtual file servers, information on disk mounting and unmounting, and information on disk access limits are included as recorded information in the service state file.

A method of using the common volume discussed above is a method of sharing the configuration information and the service state. In addition, adaptable is a method in which information is shared between the file servers, when the configuration information or the service state stored in memory changes, in such a manner that notification of the configuration information or the service state after the change is sent to other file servers through the cluster communication path 50.

FIG. 3 is a diagram for explaining tables that are used by a storage system according to an embodiment of the present invention.

The mount table 103 is provided for each of the virtual file servers. File system IDs, inode number (inode #), parent file systems, mount points, parent inode number, and device names are recorded in the mount table 103.

The file system IDs are unique codes that identify the file system. The inode number represents a number for a root directory of the file system as viewed from that file system. The parent file system specifies to which file system the file system is subordinate. The mount points are locations at which the file systems are provided, and are path names of the root directories of the file systems. The parent inode number represents a number for a root directory of the file system when counted from a higher file system. That is, a file system ID fs1 is mounted in an inode number=20 of a parent directory fs0, and an inode number=200 is allocated to a root directory of the file system ID fs1. In other words, a mount point of the file system ID fs1 is the inode number=20 on the file system ID fs0 side, and the inode number=200 on the file system ID fs1 side. The device names are names allocated to the file systems, and are used to specify the file systems.

Corresponding entries are added to the mount table 103 each time a device (device registered in the device file) allocated to the virtual file server 10a is mounted. For example, entries are added to the mount table 103 each time a file system is mounted to a virtual file server.

The mount table 103 is provided as divided for each of the virtual file servers. The directory configuration can thus vary between the virtual file servers by providing the mount table 103 as divided for each of the virtual file servers. It should be noted that it is not necessary to provide the mount table as divided for each of the virtual file servers for cases where a directory configuration is shared between the virtual file servers.

The device names and device IDs are recorded in the device file 104. For the device IDs, unique numbers are allocated in the storage system corresponding to the logical unit managed by the file system.

Corresponding entries are created in the device file 104 each time a device (disk) is allocated to a virtual file server. By using a table that is divided for each of the virtual file servers, access from the virtual file servers when a disk is mounted is limited to only the devices allocated in the table. It should be noted that it is not necessary to provide the device file as divided for each of the virtual file servers when the device file is shared across the virtual file servers.

The routing table 102 is used to determine a transfer path for a packet for cases where communication is performed through a network. Destination addresses, gateways, netmasks, and network interfaces are recorded in the routing table 102. That is, packets are transferred from a network interface eth0 for destination addresses of 192.168.1.0 to 192.168.1.255. Further, packets are transferred from a network interface eth1 for destination addresses of 192.168.2.0 to 192.168.2.255. For other destination addresses, packets are transferred from the network interface eth0 to a gateway with an address of 192.168.1.1.

The routing table 102 is provided as divided for each of the virtual file servers. Services can be performed for different networks in each of the virtual file servers by providing the routing table 102 as divided for each of the virtual file servers. That is, the network interface 11 that performs transmission by the virtual file server is different for each of the virtual file servers, and the routing table 102 is different for each of the virtual file servers. Accordingly, a system and communication can be made with a device having the same address included in another network segment.

Operation of the storage system according to an embodiment of the present invention is explained next.

First, a file system is mounted in a virtual file server prior to the access to files. The virtual file server management unit 106 performs the mounting process according to instructions from the management terminal 2. At this point an entry corresponding to a device is created in the mount table using the device file.

Name resolution for the file is necessary for access to the file. When accessing a certain file, it is necessary to convert the file, based on the file name, to an identifier capable of specifying the file. For example, the inode number is used for file identification inside the file system. However, requests from clients are made by use of an identifier referred to as a file handle in NFSs (network file systems). The file handle are the same as the inode number because of one to one correspondence.

The inode number of the parent directory and the file name are provided in name resolution process, and the inode number corresponding to the file is obtained. The network processing unit 105 converts the parent inode number of the mount point of the parent directory to the inode number of the mounted file system using the mount table when the mount point of the file system is get over. Name resolution is performed by passing the inode number and the file name to the file system processing unit 111.

The file is then specified by using the identifier obtained in name resolution process, and a request for the file is issued. When the network processing unit 105 receives the inode number and an access type for performing access, the network processing unit 105 sends the inode number and the access type to the file system processing unit 111. The file system processing unit 111 sends a request to the disk access unit 112 when necessary, and the disk is accessed.

The file server 10 receives a file access request from the client through the network. The virtual file server is determined depending upon which of the network interfaces 11 to 13 receives the file access request. Accordingly, the file access request is sent to the network processing unit 105 of the virtual file server. The file access request is also sent to the file system processing unit 111. The file system processing unit 111 makes a response by performing disk access when necessary, to the network processing unit 105. The response is then sent to the client after referencing the routing table 102.

Figure 4:
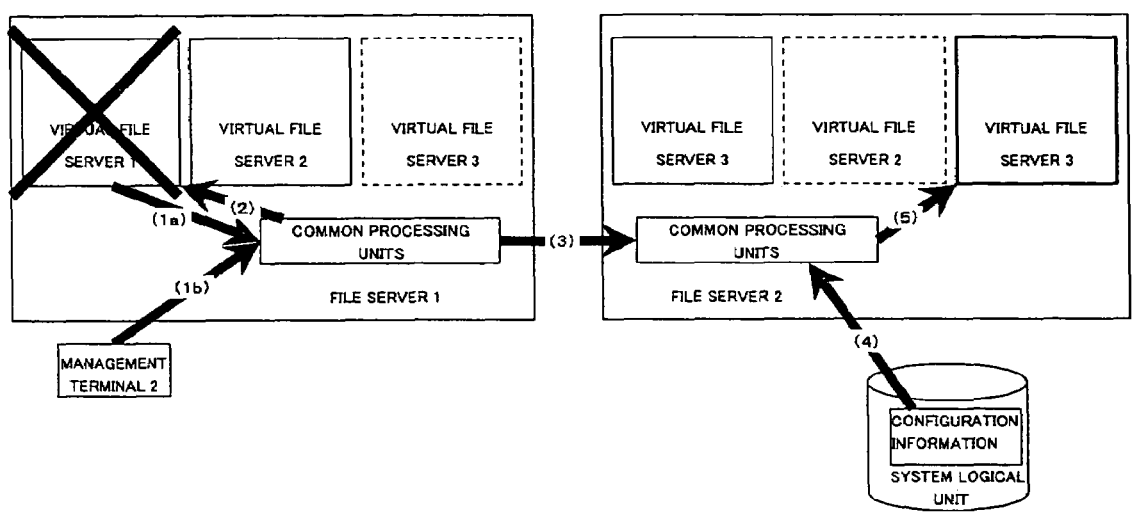
FIG. 4 is a diagram for explaining failover procedures in a storage system according to an embodiment of the present invention.

FIG. 4 is a diagram for explaining failover processing procedures in a storage system according to an embodiment of the present invention.

First, the virtual file server controlling unit 114 receives a failover instruction of the virtual file server 1. The failover instruction is issued by the virtual file server failure monitoring unit 115 when a failure occurs in the virtual file server 1 (refer to (1*a*) in FIG. 4). Virtual file system failures are supposed to occur owing to failures in the network interface 11 or the like in the virtual file server, the inability to communicate due to failures in a network connection destination, the inability to access the disk subsystem 40, and the like.

Further, the failover instruction may also be issued from the management terminal 2 for load balance. In this case, the virtual file server controlling unit 114 receives the failover instruction through the file server management unit 117 (refer to (1*b*) in FIG. 4).

Next, the virtual file server controlling unit 114 issues a shutdown instruction for the virtual file server 1 (refer to (2) in FIG. 4). The inter-server synchronizing unit 116 then sends a failover request to another file server (the file server 2) composing the cluster (refer to (3) in FIG. 4).

The virtual file server controlling unit 114 of the file server 2 then reads configuration information and the service state file from the system LUs (refer to (4) in FIG. 4). The virtual file server controlling unit 114 then starts up the virtual file server 1 in the file server 2 (refer to (5) in FIG. 4).

When the virtual file server 1 starts up, the virtual file server management unit 106 of the file server 2 mounts the file system and begins service to the client according to an instruction from the virtual file server controlling unit 114. That is, in order to perform the same service in the file server 2 as that performed in the file server 1, it is necessary to take over the service state file of the virtual file server 1 in the file server 1, which includes the mount table 103, the device file 104, and the routing table 102, to the virtual file server 1 starting up in the file server 2. Accordingly, the file server 2 reads the contents of the tables stored in the system LUs. It should be noted that a configuration may also be used in which, instead of reading the configuration information and the service state from the system LUs of the disk subsystem 40 during failover as described above, the configuration information and the service state are sent from the file server 1 to the file server 2 through the cluster communication path 50 whenever there are changes in the configuration information or the service state. The file server 2 may then use the configuration information and the service state, which are obtained from the file server 1 in advance through the cluster communication path 50, during failover.

The virtual file server 1 that has started up in the file server 2 can thus perform the same work as the virtual file server 1 that operated in the file server 1. For example, the virtual file server 1 that has started up in the file server 2 uses the same routing table as the virtual file server 1 that operated in the file server 1, and therefore the same communication path can be defined in the same network segment as that employed before.

It should be noted that issuing of the shutdown instruction for the virtual file server 1 in the file server 1 may also be performed after starting up the virtual file server 1 in the file server 2. However, it is necessary for the inter-server synchronization unit 116 to synchronize the operation of the file server 1 and the operation of the file server 2 so that service by the file server 2 begins after shutdown of service by the file server 1.

FIG. 5 is a diagram for explaining a virtual file server setting screen in a storage system according to an embodiment of the present invention.

Instructions for setting up and transferring the virtual file servers are issued from the management terminal 2 through the file server management unit 117. A graphical user interface (GUI) or command line interface (CLI) may be used as a user interface.

With the virtual file server setting screen shown in FIG. 5, which file server operates a virtual file server (VS#) within the cluster can be set for each virtual file server.

In the disposal setting screen, a device# represents a file server (device) configuring the cluster, and VS# represents a virtual file server allocated. With the screen, a user selects file servers to start up virtual file servers, and places a mark on the virtual file servers one by one. Changes are then reflected by operating an update button, and the information set is stored in the system LUs as configuration information. The virtual file servers then transfer dynamically.

Further, commands are set with the virtual file server and the file server number (device number) as variables for cases where a CLI is used, for prescribing a correspondence between the virtual file servers and the file servers. For example, a command such as "vnas alloc (name) {device#: device number}" is defined.

In the embodiments of the present invention explained above, when performing failover of a virtual file server of the file server 10 to the file server 20, the virtual file server controlling unit 114 of the file server 10 reads the configuration information, a copy of the mount table, a copy of the routing table, and a copy of the device file from the system LUs, and starts up a virtual file server in the file server 20. A virtual file server that is the same as that of the file server 10 can accordingly be started up in the file server 20. Further, by taking over the configuration information and the service state information, and by starting up and shutting down the virtual file servers with synchronization between the file servers, the servers (devices) that operate the virtual file servers can be changed even during operation of the file servers.

In particular, a copy of the routing table is read from the system LUs, and a virtual file server starts up in the file server 20. Accordingly, the virtual file server that starts up in the file server 20 can define a communication path by using the routing table. The same communication path in the same network segment as that employed previously can therefore be defined.

While the present invention has been described in detail and pictorially in the accompanying drawings, the present invention is not limited to such detail but covers various obvious modifications and equivalent arrangements, which fall within the purview of the appended claims.

What is claimed is:

1. A management terminal comprising;
a CPU;
a management program executing to perform settings on the file servers; and
a network interface coupled to a network, to which the file servers are coupled, wherein
the management program:
instructs each of the file servers to configure plural virtual file systems, and
issues a file system transfer instruction to one of the file servers, the file system transfer instruction instructs the one of the file servers to transfer a virtual file system configured in the one of the file servers to another one of the file servers;
wherein, according to one of the file system transfer instructions, the one of the file servers:
shuts down execution of the virtual file system, and transfers configuration of the virtual file system to another one of the file servers; and
the another one of the filer servers:
obtains the configuration information of the virtual file system whose configuration is transferred, and
configures the virtual file system using the configuration information obtained,
wherein each of the file servers is coupled to a storage system including a shared logical unit shared between the file servers and the configuration information for the plural virtual file systems is stored in the shared logical unit,
when the management program issues the file system transfer instruction, the configuration information indicating a logical unit in the storage system assigned for the virtual file system and the network interface used for the virtual file system is updated according to the file system transfer instruction, and
the another one of the file servers reads the updated configuration information from the shared logical unit and configures the virtual file system using the configuration information.

2. A management terminal according to claim 1, wherein the file system transfer instruction includes an identifier of the another one of the file servers and an identifier of the virtual file system that is to be transferred from the one of the file servers to the another one of the file servers.

3. A management terminal according to claim 2, wherein the one of the file servers, which is a source of the transfer, and the another one of the file servers, which is a destination of the transfer, designate the virtual file system to be transferred from the one of the file servers to the another one of the file servers by using the identification of the virtual file system, and
the another one of the file servers obtains the configuration information of the designated virtual file system from the configuration information of plural virtual file systems.

4. A management terminal according to claim 1, wherein the configuration information includes a routing information for the virtual file system, a mounting information for the virtual file system, and device files for the virtual file system.

5. A computer system comprising:
a storage system storing data,
plural file servers controlling input and output of data on the storage system, and
a management terminal managing the file servers,
wherein a management terminal comprising:
a CPU;
a management program executing to perform settings on the file servers; and
a network interface coupled to a network, to which the file servers are coupled, wherein
the management program:
instructs each of the file servers to configure plural virtual file systems, and
issues a file system transfer instruction to one of the file servers, the file system transfer instruction instructs the one of the file servers to transfer a virtual file system configured in the one of the file servers to another one of the file servers;
wherein, according to the file system transfer instruction, the one of the file servers:
shuts down execution of the virtual file system, and transfers configuration of the virtual file system to the another one of the file servers, and
the another one of the file servers:
obtains the configuration information of the virtual file system whose configuration is transferred, and
configures the virtual file system using the configuration information obtained,
wherein each of the file servers is coupled to a storage system including a shared logical unit shared between the file servers and the configuration information for the plural virtual file systems is stored in the shared logical unit,
when the management program issues the file system transfer instruction, the configuration information indicating a logical unit in the storage system assigned for the virtual file system and the network interface used for the virtual file system is updated according to the file system transfer instruction, and the another one of the file servers reads the undated configuration information from the shared logical unit and configures the virtual file system using the configuration information.

6. A computer system according to claim 5, wherein the file system transfer instruction includes an identifier of the another one of the file servers and an identifier of the virtual file system to be transferred from the one of the file servers to the another one of the file servers.

7. A computer system according to claim 6, wherein the one of the file servers, which is a source of the transfer, and the another one of the file servers, which is a destination of the transfer designate the virtual file system to be transferred from the one of the file servers to the another one of the file servers by using the identification of the virtual file system, and the another one of the file servers obtains the configuration information of the designated virtual file system from the configuration information of the plural virtual file systems.

8. A computer system according to claim 5, wherein the configuration information includes a routing information for the virtual file system, a mounting information for the virtual file system, and device files for the virtual file system.

* * * * *